(12) United States Patent
Kim et al.

(10) Patent No.: US 10,250,316 B2
(45) Date of Patent: Apr. 2, 2019

(54) FULL-DUPLEX RELAY COMMUNICATION METHOD USING ENERGY HARVESTING, FULL-DUPLEX RELAY COMMUNICATION SYSTEM BASED ON ENERGY-HARVESTING, RELAY NODE DEVICE, AND SOURCE NODE DEVICE

(71) Applicant: RESEARCH & BUSINESS FOUNDATION SUNGKYUNKWAN UNIVERSITY, Suwon-si (KR)

(72) Inventors: Dong In Kim, Seongnam-si (KR); Keum Cheol Hwang, Suwon-si (KR); Jong Ho Moon, Suwon-si (KR); Jong Jin Park, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 118 days.

(21) Appl. No.: 15/397,130

(22) Filed: Jan. 3, 2017

(65) Prior Publication Data

US 2017/0310380 A1    Oct. 26, 2017

(30) Foreign Application Priority Data

Apr. 22, 2016 (KR) ........................ 10-2016-0049156

(51) Int. Cl.
*H04B 7/14*  (2006.01)
*H04L 5/14*  (2006.01)
*H04B 7/155* (2006.01)

(52) U.S. Cl.
CPC ............... *H04B 7/14* (2013.01); *H04B 7/155* (2013.01); *H04L 5/14* (2013.01)

(58) Field of Classification Search
CPC .............. H04B 7/14; H04B 7/155; H04L 5/14
See application file for complete search history.

(56) References Cited

FOREIGN PATENT DOCUMENTS

KR    10-2014-0136938 A    12/2014

OTHER PUBLICATIONS

Yong Zeng, "Full-Duplex Wireless-Powered Relay With Self-Energy Recycling", IEEE Wireless Communication Letters. vol. 4, No. 2 Apr. 2015.*

Choi, Dongwook et al., "Performance Analysis of a Full-Duplex Two-Way Relay Network over Rayleigh Fading Channels" *Journal of The Institute of Electronics and Information Engineers*, vol. 51, No. 3 (pp. 469-475).

(Continued)

*Primary Examiner* — Siming Liu
(74) *Attorney, Agent, or Firm* — NSIP Law

(57) ABSTRACT

A method using energy harvesting including receiving, by a relay node, first information signals transmitted from a source node and second information signals transmitted from a destination node, harvesting, by the relay node, energy using energy signals transmitted from the source node while bi-directionally relaying the first information signals and the second information signals; receiving, by the source node, information signals transmitted by the relay node; and receiving, by the destination node, the information signals relayed by the relay node. The source node, the relay node, and the destination node are devices for performing communication in a full-duplex mode.

18 Claims, 6 Drawing Sheets

(56) References Cited

OTHER PUBLICATIONS

Jin, Park Jong, "Full Duplex Wireless Powered Two-way Relay with Time Switching-based Protocol and Self-Energy Recycling", *College of Information and Communication Engineering, Sungkyunkwan University*, 2015 (1 pages in English and 2 pages in Korean).

Zeng, Yong et al. "Full-Duplex Wireless-Powered Relay With Self-Energy Recycling", *IEEE Wireless Communications Letters*, vol. 4, No. 2, Apr. 2015 (pp. 201-204).

Korean Office Action dated Sep. 14, 2017 in corresponding Korean Patent Application No. 10-2016-0049156 (5 pages in Korean).

Korean Notice of Allowance dated Dec. 5, 2017 in corresponding Korean Patent Application No. 10-2016-0049156 (2 pages in Korean).

\* cited by examiner

FULL-DUPLEX RELAY COMMUNICATION METHOD USING ENERGY HARVESTING, FULL-DUPLEX RELAY COMMUNICATION SYSTEM BASED ON ENERGY-HARVESTING, RELAY NODE DEVICE, AND SOURCE NODE DEVICE

CROSS-REFERENCE TO RELATED APPLICATION

This application claims the benefit under 35 U.S.C. 119(a) of Korean Patent Application No. 10-2016-0049156 filed on Apr. 22, 2016, in the Korean Intellectual Property Office, the entire disclosure of which is incorporated herein by reference for all purposes.

BACKGROUND

1. Field

The following description related to a technique and device for full-duplex relay communication that is supplied with power in a wireless manner.

2. Discussion of Related Art

Simultaneous wireless information and power transfer (SWIPT) is a communication method that simultaneously utilizes both information and energy of a radio frequency (RF) signal. SWIPT could be applied to a communication environment with a relay.

In an environment with a relay, protocols utilizing energy harvesting are largely classified into two types. One is a time-switching based relaying (TSR) protocol in which time is divisionally used for information transmission and energy harvesting and the other one is a power-splitting based relaying (PSR) protocol in which power of a single signal is divisionally used for information transmission and energy harvesting.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A conventional TSR or PSR technique operates in a half-duplex mode. Accordingly, it is impossible to transmit or receive information and energy at the same time. The following technology is intended to provide a technique for communicating in a full-duplex mode on the basis of RF energy harvesting.

In one general aspect, there is provided a full-duplex relay communication method using energy harvesting, the full-duplex relay communication method including receiving, by a relay node, first information signals transmitted from a source node and second information signals transmitted from a destination node, harvesting, by the relay node, energy using energy signals transmitted from the source node while bi-directionally relaying the first information signals and the second information signals; receiving, by the source node, information signals transmitted by the relay node; and receiving, by the destination node, the information signals relayed by the relay node. The source node, the relay node, and the destination node are devices for performing communication in a full-duplex mode.

In another general aspect, there is provided a full-duplex relay communication system based on energy harvesting, the full-duplex relay communication system including a first node, a second node, and a relay node, wherein the first node transmits first information signals including encoded data and energy signals for energy harvesting and receives second information signals including encoded data transmitted by the second node from the relay node, the second node transmits the second information signals and receives the first information signals transmitted by the first node from the relay node, and the relay node receives the energy signals to harvest energy and relays the received first information signals and second information signals.

Figure 1:
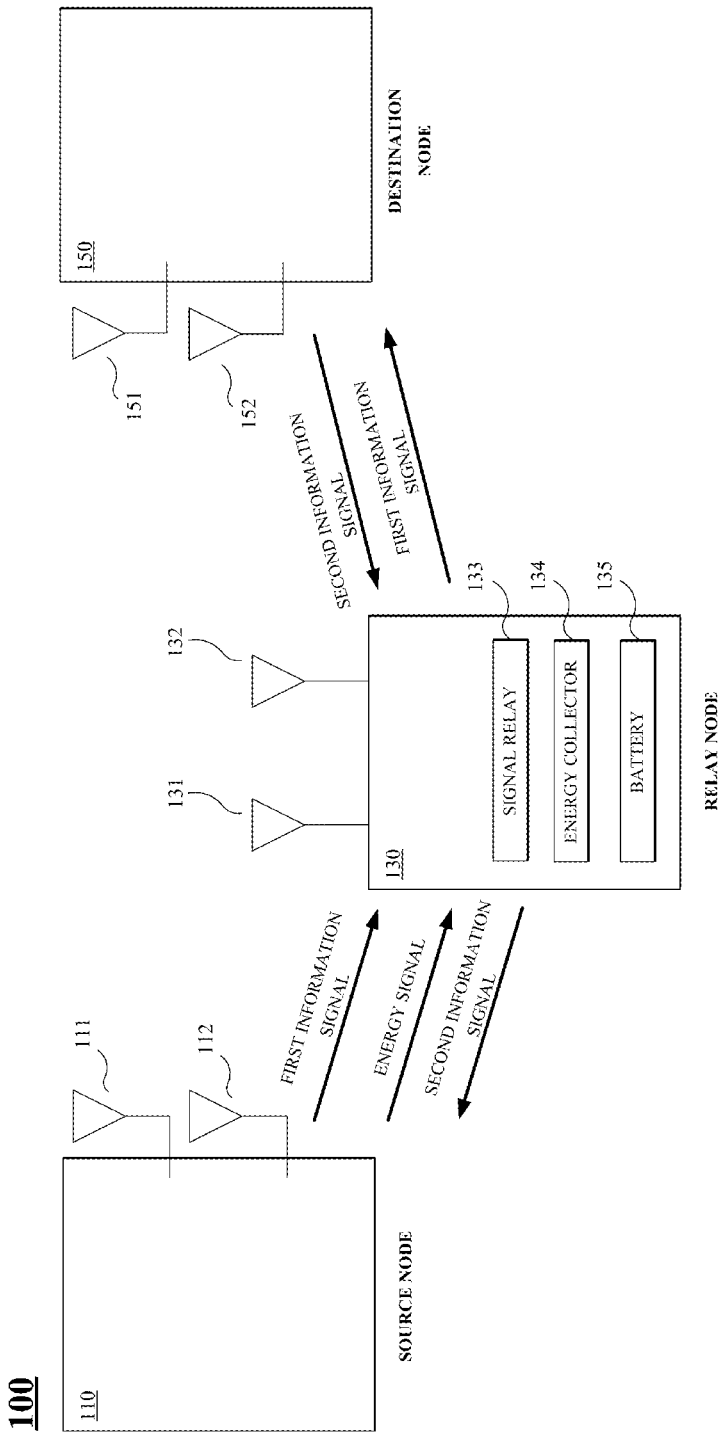
FIG. 1 illustrates an example of block diagram of a full-duplex relay communication system based on energy harvesting.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The technique described below relates to SWIPT-based bidirectional relay communication. The technique described below is based on the premise of an in-band full-duplex communication system.

FIG. 1 illustrates an example of block diagram of a full-duplex relay communication system based on energy harvesting 100. The full-duplex relay communication system 100 includes a source node 110, a relay node 130, and a destination node 150. The full-duplex relay communication system 100 may include other nodes in addition to the nodes shown in FIG. 1. For convenience of description, only three nodes are shown in FIG. 1. Each of the source node 110 and the destination node 150 is a device for transmitting signals including certain information. A signal including information is referred to as an information signal. Generally, an information signal includes a packet with a certain format. The source node 110 may transmit an information signal to the destination node 150, and the destination node 150 may transmit an information signal to the source node 110. The information signal transmitted by the source node 110 is referred to as a first information signal, and the information signal transmitted by the destination node 150 is referred to as a second information signal. Each of the source node 110 and the destination node 150 includes at least two antennas for full-duplex communication. The source node 110 includes a receive antenna 111 and a transmit antenna 112. The destination node 150 includes a receive antenna 151 and a transmit antenna 152. Each of the source node 110 and the destination node 150 may include an element for encoding information to generate an information signal and an element for decoding an information signal.

The relay node 130 serves to relay an information signal received from the source node 110 and/or the destination node 150. The relay node 130 includes a receive antenna 131, a transmit antenna 132, a signal relay 133, an energy harvester 134, and a battery 135. The receive antenna 131 receives signals, and the transmit antenna 132 transmits an information signal that is received.

A method in which the relay node 130 processes the received signal is classified into two modes. The relay node 130 may use a time-switching based relaying (TSR) mode and/or a power-splitting based relaying (PSR) mode. (1) The TSR mode is a mode in which a signal received from a source is split based on time, information is received for a certain time, and energy is received for another certain time. (2) The PSR mode is a mode in which a signal received from a source is split based on power, information is received at a certain portion, and energy is received at another certain portion. According to the modes, the relay node 130 transmits an information signal including information to a destination and harvests energy using a signal including energy. A signal including energy is referred to as an energy signal.

A signal relay refers to an element for relaying an information signal that is received. Broadly, the relay node 130 may perform a signal relaying operation in two methods. A decode-and-forward (DF) mode and/or an amplify-and-forward (AF) mode may be used as the relay method. (1) The AF mode is a method in which a relay node amplifies a signal received from a source without decoding the signal and transmits the amplified signal to a destination. (2) The DF mode is a method in which a relay node decodes a signal received from a source, re-encodes the decoded signal, and transmits the re-encoded signal to a destination. The relay node 130 may use the AF mode or the DF mode. The signal relay 133 has a different configuration depending on the relay method. In the AF mode, an amplifier for amplifying a received analog signal is used. In the AF mode, a filter for removing noise may also be used. In the DF mode, a decoder for decoding a received signal, an encoder for re-encoding the decoded signal, and an amplifier for amplifying the signal are included. Detailed descriptions of the elements of the signal relay 133 will be omitted.

The energy harvester 134 refers to an element for harvesting energy using a received RF signal. The battery 135 stores energy generated by the energy harvester 134. The energy harvester 134 is an element for harvesting energy using an RF signal. The energy harvester 134 includes an impedance matching circuit for minimizing power loss of an RF signal received through the receive antenna 131 and a rectifier for converting an output RF signal of the impedance matching circuit into a DC signal. The energy harvester 134 may also use a separate dedicated antenna in addition to an antenna for receiving an information signal. The energy harvester 134 may also include a DC-DC converter for further regulating a signal output from the rectifier into a certain voltage.

Broadly, the relay node 130 may harvest energy using two types of signals. The relay node 130 may use a dedicated energy signal that is transmitted by the source node 110. Also, the relay node 130 may perform energy harvesting using an ambient RF signal (ambient energy harvesting). When an ambient RF signal is used, the relay node 130 may use, for example, a multi-band antenna. The receive antenna 131 may be a multi-band antenna.

The source node 110 is assumed to transmit a dedicated energy signal for energy harvesting. It should be appreciated that a device other than the source node 110 may transmit an RF signal for energy harvesting. The source node 110 may generate a tone signal for transmitting an energy signal.

Figure 2:
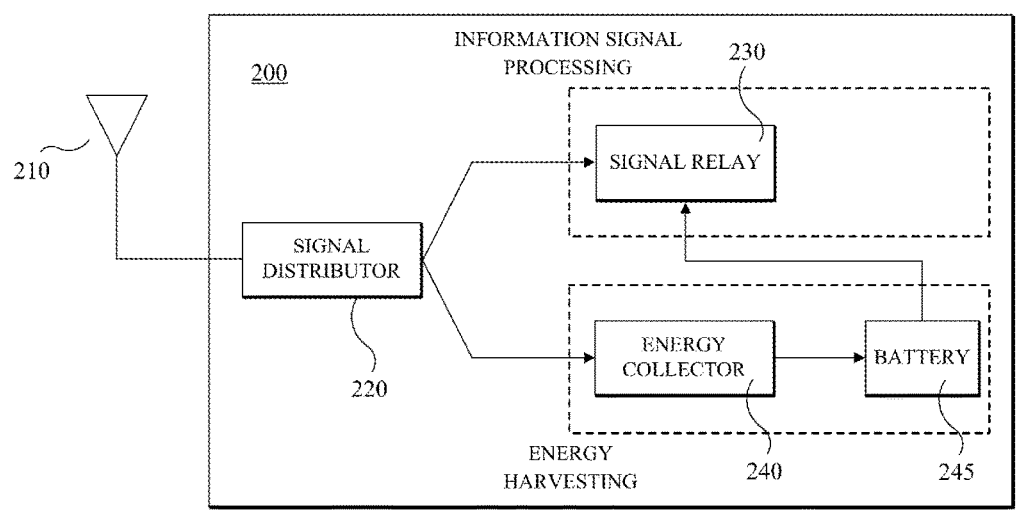
FIG. 2 illustrates an example of block diagram of a relay node.

FIG. 2 illustrates an example of block diagram of a relay node 200. The relay node 200 is an element corresponding to the relay node 130 of FIG. 1. However, unlike the relay node 130, only a receive antenna 210 is shown in FIG. 2. A signal distributor 220 distributes a received signal according to whether the signal is an information signal for relaying or an energy signal for energy harvesting. When the signal distributor 220 uses the TSR mode, the signal distributor 220 delivers a signal of a certain period to a signal relay 230 and delivers a signal of another period to the energy harvester 240 on the basis of time. When the signal distributor 220 uses the PSR mode, the signal distributor 220 splits a received signal, delivers a certain portion of the signal to the signal relay 230 and delivers the remaining portion of the signal to the energy harvester 240. The battery 245 stores energy harvested by the energy harvester 240.

Figure 3A:
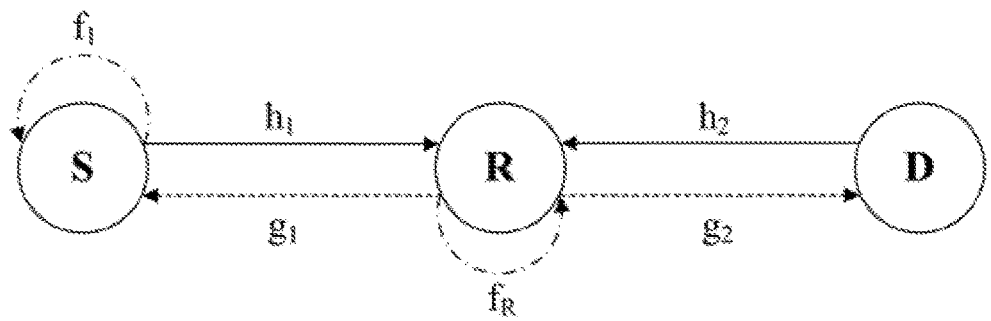
FIGS. 3A-3C illustrate examples of diagrams of a full-duplex relay communication system.
Figure 3B:
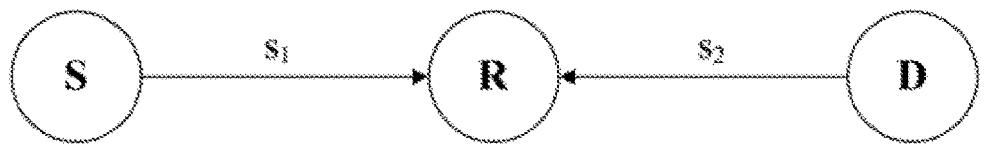
Figure 3C:
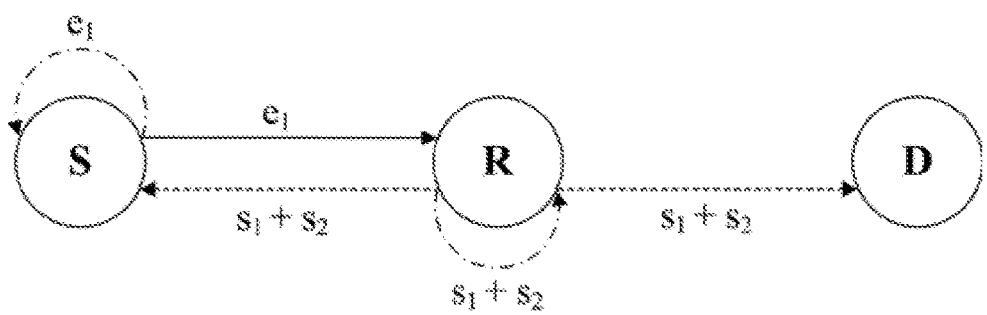

FIGS. 3A-3C illustrate examples of diagrams of a full-duplex relay communication system. FIGS. 3A-3C are examples of diagrams illustrating operation of the full-duplex relay communication system 100. In FIGS. 3A-3C, the source node 110 is represented as S, the relay node 130 is represented as R, and the destination node 150 is represented as D.

FIG. 3A shows an example of a communication environment of a full-duplex relay communication system. $h_1$ is a channel gain of a path through which a signal is transmitted from the source node S to the relay node R. $h_2$ is a channel gain of a path through which a signal is transmitted from the destination node D to the relay node R. $g_1$ is a channel gain of a path through which a signal is transmitted from the relay node R to the source node S. $g_2$ is a channel gain of a path through which a signal is transmitted from the relay node R to the destination node D. $f_1$ denotes a coupling loss of a channel through which an energy signal that was transmitted by the source node S is returned (i.e., a loop-back channel). $f_R$ denotes a coupling loss of a channel through which a signal that was relayed by the relay node R is returned.

The full-duplex relay communication system of FIGS. 3A-3C perform different operations in two time sections separated at time T, as shown in the following table. $s_1$ denotes a first information signal that is transmitted by the source node S, and $s_2$ denotes a second information signal that is transmitted by the destination node D. $e_1$ denotes an energy signal transmitted by the source node S.

TABLE 1

| T/2 | T/2 |
|---|---|
| $s_1$: S -> R | $s_1 + s_2$: R -> S, D, R |
| $s_2$: D -> R | $e_1$: S -> R |

FIG. 3B is an example showing operation of the full-duplex relay communication system during a first half T/2, and FIG. 3C is an example showing operation of the full-duplex relay communication system during a second half T2. Each of the operations will be described in chronological order.

Referring to FIG. 3B, the source node S transmits the first information signal $s_1$ to the relay node R through a transmit antenna thereof. The destination node D transmits the second information signal $s_2$ to the relay node R through a transmit antenna thereof. The relay node R receives the signal transmitted by the source node S or destination node D through a receive antenna thereof. In this case, a signal $y_{R,1}[k]$ received by the relay node R may be expressed by Equation (1) below:

$$y_{R,1}[k] = \sqrt{P_1} h_1 s_1[k] + \sqrt{P_2} h_2 s_2[k] + n_R[k] \quad \text{[Equation 1]}$$

where $s_1[k]$ denotes the first information signal transmitted by the source node S, $P_1$ denotes power used by the source node S to transmit the first information signal, $s_2[k]$ denotes the second information signal transmitted by the destination node D, $P_2$ denotes power used by the destination node D to transmit the second information signal, $h_1$ is the channel gain of the path through which the signal is transmitted from the source node S to the relay node R, $h_2$ is the channel gain of the path through which the signal is transmitted from the destination node D to the relay node R, and $n_R[k]$ denotes noise received together with the signal received by the relay node R.

Referring to FIG. 3C, the relay node R bi-directionally relays the signals $s_1 + s_2$ received from the source node S and the destination node D through a transmit antenna thereof. In this case, the relay node R is assumed to use only energy that is harvested. This assumption is called an energy constraint condition and may be expressed by Equation (2) below:

$$E_R E \leq E_{EH} \quad \text{[Equation 2]}$$

where ER denotes energy used by the relay node R to deliver information to the source node S and the destination node D, and $E_{EH}$ denotes energy harvested by the relay node R.

The source node S transmits an energy signal to the relay node R through the transmit antenna thereof. A tone signal may be used as the energy signal. The tone signal is carried through a null part of spectrum of an information signal (i.e., a suppressed carrier). For example, when the information signal is a voice signal with no DC component, the energy signal is positioned around a carrier frequency band of the information signal.

Since the relay node R operates in a full-duplex mode, the relay node R receives a signal through the receive antenna thereof while relaying signals through the transmit antenna thereof. The signals received by the relay node R are a self-interference signal that is returned after the relay node R relays the signal and the energy signal transmitted by the source node S. A signal $y_{R,2}[k]$ received by the relay node R is expressed by Equation (3) below:

$$Y_{R,2}[k] = \sqrt{P_{1,e}} h_1 e_1[k] + \sqrt{P_R} f_R s_R[k] + n_R[k] \quad \text{[Equation 3]}$$

where $P_{i,e}$ is power used by the source node S to transmit the energy signal to the relay node R, $P_R$ is power used by the relay node R to perform relay transmission, $e_1$ is the energy signal transmitted by the source node S, $s_R$ denotes the information signals $s_1 + s_2$ relayed by the relay node R, $n_R$ denotes noise received by the relay node R, and $f_R$ denotes the coupling loss of the channel through which the signal that was relayed by the relay node R is returned.

The relay node R may harvest energy from a self-interference signal $\sqrt{P_R} f_R s_R[k]$ returned among signals that were transmitted by the relay node R as well as the energy signal transmitted by the source node S. Such a method is called self-energy recycling.

Figure 4A:
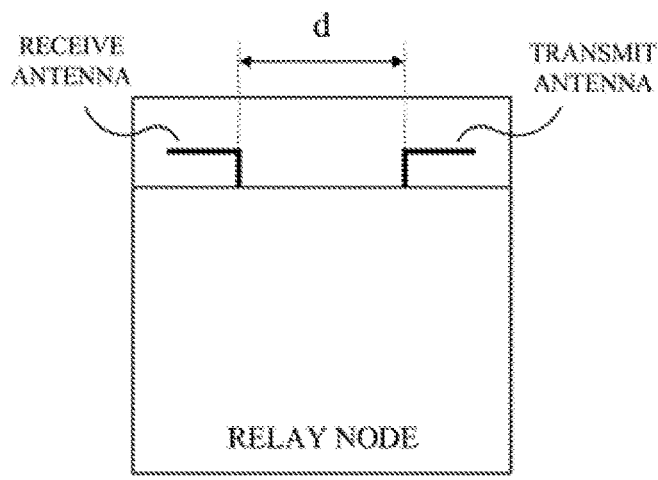
FIGS. 4A-4B illustrates an example of a relay node and a graph for a distance between antennas of a relay node and a level of coupling between an energy receive antenna and an information transmission antenna at the relay node.
Figure 4B:
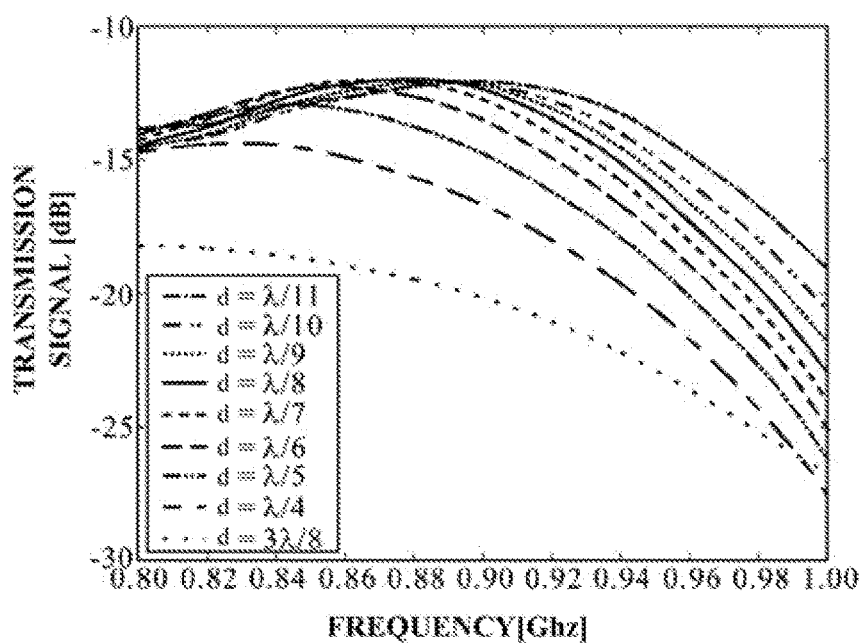

The coupling loss of the signal received by the relay node R may be determined as a function of a distance between the transmit antenna and the receive antenna of the relay node R. FIGS. 4A and 4B illustrate examples of a relay node and a graph for a distance between antennas of a relay node and a level of coupling between an energy receive antenna and an information transmit antenna at the relay node. FIG. 4A represents a distance between a receive antenna and a transmit antenna of the relay node R as d. FIG. 4B shows a graph showing a coupling loss level with respect to the distance between the energy receive antenna and the information transmitting antenna at the relay node. Referring to FIG. 4B, the coupling level increases at a carrier frequency of 900 MHz as the distance d decreases. However, when d is less than or equal to $\lambda/8$ ($\lambda$ is a wavelength), the coupling level converges to about −12 dB and no longer increases.

In terms of energy harvesting, it is preferable that the relay node R receives a signal with high energy. Preferably, the relay node R optimizes the coupling level in order to harvest much energy using the self-interference signal. Accordingly, it is preferable that the distance d between the receive antenna and the transmit antenna of the relay node R be about $\lambda/8$. Alternatively, it is preferable that $d \geq \lambda/8$.

The signal received through the receive antenna at the destination node D is the signal relayed at the relay node R. A signal $y_D[k]$ received by the destination node D may be expressed by Equation (4) below.

$$y_D[k] = \sqrt{P_R} g_2 s_R[k] + n_D[k] \quad \text{[Equation 4]}$$

where $g_2$ is the channel gain of the path from the relay node R to the destination node D, and $n_D$ denotes noise received by the destination node D.

First, the destination node D removes the signal $s_2$ of the destination node D from the received signals $s_1 + s_2$ in order to obtain desired information from the received signals. The destination node D may decode the desired information from the signal from which the second information signal is removed.

On the other hand, since the source node S operates in the full-duplex mode, the source node S receives the self-interference signal and the signals $s_1 + s_2$ relayed by the relay node R through the receive antenna thereof. Here, the self-interference signal denotes a signal that is returned among energy signals that were transmitted by the source node S.

Figure 5:
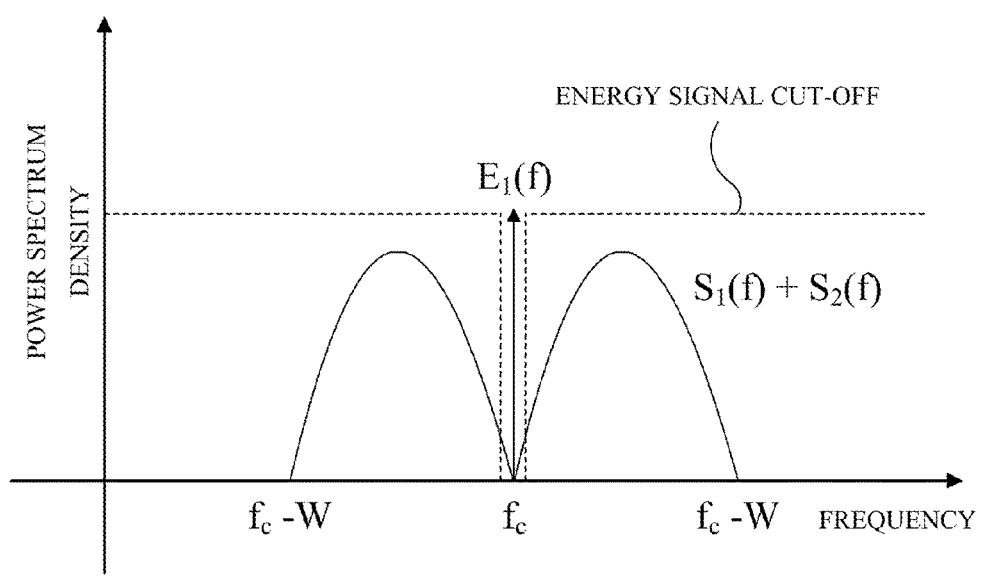
FIG. 5 illustrates an example of a spectrum of a signal received at a source node.

FIG. 5 illustrates an example of a spectrum of a signal received at a source node. In FIG. 5, W denotes a bandwidth of an information signal. A signal $y_s[k]$ received by the source node S may be expressed by Equation (5) below:

$$y_s[k] = \sqrt{P_R} g_1 s_R[k] + \sqrt{P_{1,e}} f_1 e_1[k] n_s[k] \quad \text{[Equation 5]}$$

where, $g_1$ denotes the channel gain of the path from the relay node R to the source node S, $f_1$ denotes the coupling loss of the channel through which the energy signal that was transmitted by the source node S is returned, and $n_s$ denotes the noise received from the source node S.

First, the source node S should remove an energy signal $\sqrt{P_{1,e}}f_1e_1[k]$ received through the self-interference signal from the received signals. The energy signal is a tone signal and has a very small bandwidth. Accordingly, the source node S may use a cutoff filter to remove the tone signal from the received signals. For example, the source node S may use a narrowband cutoff filter such as a notch filter around the carrier frequency band in which the tone signal is positioned, so as to remove the tone signal easily. In FIG. 5, a section in which an energy signal is removed from the signals received by the source node S is represented by dotted lines.

The received signals from which the energy signal is removed by the source node S include the signal relayed by the relay node R and the receive noise. In this case, the source node S removes the first information signal $s_1$ of the source node S from the signals $s_1+s_2$ relayed by the relay node R. Finally, the remaining signals include the second information signal $s_2$ and the noise. The source node may obtain desired information from the resulting signal.

Figure 6:
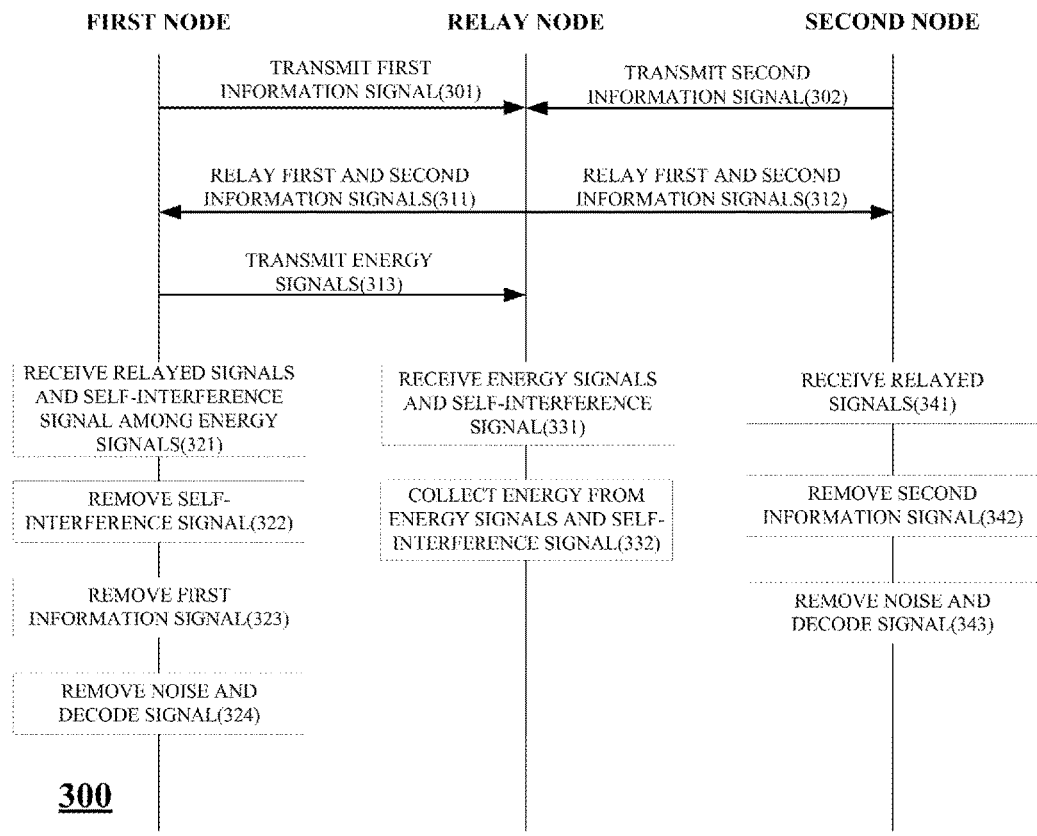
FIG. 6 illustrates an example of flow diagram for a full-duplex relay communication method using energy harvesting.

FIG. 6 illustrates an example of flow diagram for a full-duplex relay communication method 300 using energy harvesting.

A first node transmits a first information signal (301), and at the same time, a second node transmits a second information signal (302).

A relay node bi-directionally relays the received first information signal and second information signal (311 and 312). At the same time, the first node transmits energy signals for harvesting energy (313).

The first node receives the signal relayed by the relay node and a self-interference signal returned among the energy signals (321). The first node removes the self-interference signal from the received signals (322). The first node removes the first information signal that is transmitted by the first node from the received signals (323). The first node decodes the resulting signal to acquire desired information (324). The first node may remove noise before decoding the resulting signal (324).

The relay node receives the energy signals transmitted by the first node and the self-interference signal returned among the relayed signals (331). Basically, the relay mode harvests energy using the energy signals (332). Furthermore, the relay node may further use the received self-interference signal to harvest energy (332).

The second node receives the relayed signals transmitted by the relay node (341). The second node removes the second information signal that is transmitted by the second node from the received signals (342). The second node decodes the resulting signal to acquire desired information (343). The second node may remove noise before decoding the final signal (343).

The full-duplex relay communication technique using energy harvesting is applicable to the following examples as well as the above embodiments. (1) The above description assumes that each node has one transmit antenna and one receive antenna. However, in the above-described full-duplex relay communication using energy harvesting, each node may use multiple antennas. (2) An environment in which the relay node R uses only harvested energy when the relay node R performs bi-directional relaying is considered. An environment in which the relay node R performs relaying using its own energy in addition to energy harvested by the relay node R (i.e., dual battery) may also be considered. (3) The energy signal of the source node S is assumed to be composed of one tone signal. However, multiple tone signals may be applied as the energy signal. (4) The energy harvesting at the relay node R considers a case in which the energy signal and the self-interference signal are used. Furthermore, the relay node R may additionally harvest energy through a power-splitting or time-switching method on the basis of the information signal transmitted by the source node S and/or the destination node D.

The following technique enables effective communication by delivering information and energy in the full-duplex mode.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A full-duplex relay communication method, comprising:
  receiving, by a relay node, first information signals transmitted from a source node and second information signals transmitted from a destination node;
  harvesting, by the relay node, energy using energy signals transmitted from the source node while bi-directionally relaying the first information signals and the second information signals;
  receiving, by the source node, information signals transmitted by the relay node;
  receiving, by the destination node, information signals relayed by the relay node; and
  removing, by the destination node, a returned signal among the second information signals from the received information signals relayed by the relay node,
  wherein the source node, the relay node, and the destination node communicate in a full-duplex mode.

2. The full-duplex relay communication method of claim 1, wherein the harvesting of the energy comprises additionally receiving a signal returned to the relay node among the relayed signals in order to harvest energy.

3. The full-duplex relay communication method of claim 1, wherein a distance between a transmission antenna and a reception antenna of the relay node is $\lambda/8$, wherein $\lambda$ is a signal wavelength.

4. The full-duplex relay communication method of claim 1, wherein the source node transmits the energy signals, each of which includes one or more tone signals, by virtue of a suppressed carrier of the information signals.

5. The full-duplex relay communication method of claim 1, wherein the receiving of the relayed information signals comprises removing, by the source node, a signal returned to the source node among the energy signals from the received signals, and removing, by the source node, a signal returned among the first information signals from the received signals.

6. The full-duplex relay communication method of claim 5, wherein the source node uses a narrowband cutoff filter to remove the signal returned to the source node among the energy signals.

7. The full-duplex relay communication method of claim 1, wherein in response to enough energy to relay signals to the source node and the destination node being harvested, the relay node relays the first information signals and the second information signals.

8. The full-duplex relay communication method of claim 1, wherein the relay node receives an ambient RF signal other than the energy signals through a multi-band antenna, and additionally harvests energy from the received RF signal.

9. A full-duplex relay communication system, comprising:
   a first node;
   a second node; and
   a relay node, wherein
      the first node is configured to transmit first information signals including encoded data and energy signals, and receive second information signals including encoded data transmitted by the second node from the relay node,
      the second node is configured to transmit the second information signals, receive the first information signals transmitted by the first node from the relay node, and remove a returned signal among the second information signals from signals received from the relay node,
      the relay node is configured to receive the energy signals to harvest energy, and relay the first information signals and the second information signals, and
      the first node, the relay node, and the second node are configured to communicate in a full-duplex mode.

10. The full-duplex relay communication system of claim 9, wherein the relay node is further configured to additionally receive a signal returned to the relay node among the relayed signals to harvest energy.

11. The full-duplex relay communication system of claim 9, wherein the first node is further configured to transmit the energy signals, each of which includes one or more tone signals, by virtue of a suppressed carrier of the information signals.

12. The full-duplex relay communication system of claim 9, wherein the first node is further configured to remove a signal returned to the source node among the energy signals from the signals received from the relay node by using a narrowband cutoff filter, and remove a signal returned from the first information signals therefrom.

13. The full-duplex relay communication system of claim 9, wherein a distance between a transmission antenna and a reception antenna of the relay node is $\lambda/8$, wherein $\lambda$ is a signal wavelength.

14. The full-duplex relay communication system of claim 9, wherein the relay node is further configured to receive an ambient RF signal other than the energy signals through a multi-band reception antenna, and additionally harvest energy using the received RF signal.

15. A source node, comprising:
   a first antenna configured to sequentially transmit first information signals and energy signals for energy harvesting to a relay node in a full-duplex communication mode,
   a second antenna configured to receive signals including second information signals received from a destination node and then relayed by the relay node,
   a narrowband cutoff filter to remove a signal returned to the source node among the energy signals from the received signals, and
   another filter configured to remove a returned signal among the first information signals.

16. A full-duplex relay communication system, comprising:
   a first node;
   a second node; and
   a relay node, wherein
      the first node is configured to transmit first information signals including encoded data and energy signals, receive second information signals including encoded data transmitted by the second node from the relay node, remove a signal returned to the first node among the energy signals from signals received from the relay node by using a narrowband cutoff filter, and remove a returned signal from the first information signals,
      the second node is configured to transmit the second information signals, and receive the first information signals transmitted by the first node from the relay node,
      the relay node is configured to receive the energy signals to harvest energy, and relay the first information signals and the second information signals, and
      the first node, the relay node, and the second node are configured to communicate in a full-duplex mode.

17. The full-duplex relay communication system of claim 16, wherein the relay node is further configured to additionally receive a signal returned to the relay node from the relayed signals to further harvest energy.

18. The full-duplex relay communication system of claim 16, wherein a distance between a transmission antenna and a reception antenna of the relay node is $\lambda/8$, wherein $\lambda$ is a signal wavelength.

* * * * *